US00RE49904E

(19) United States
(12) Reissued Patent
Fleischman et al.

(10) Patent Number: US RE49,904 E
(45) Date of Reissued Patent: *Apr. 2, 2024

(54) SYSTEMS AND METHODS FOR CLOUD DATA SECURITY

(71) Applicant: DocuSign, Inc., San Francisco, CA (US)

(72) Inventors: Eric Fleischman, Redmond, WA (US); Duane Wald, Kent, WA (US); Donald G. Peterson, Kirkland, WA (US)

(73) Assignee: DocuSign, Inc., San Francisco, CA (US)

( * ) Notice: This patent is subject to a terminal disclaimer.

(21) Appl. No.: 17/558,013

(22) Filed: Dec. 21, 2021

Related U.S. Patent Documents

Reissue of:
(64) Patent No.: 10,135,799
Issued: Nov. 20, 2018
Appl. No.: 15/682,061
Filed: Aug. 21, 2017

U.S. Applications:
(63) Continuation of application No. 17/023,040, filed on Sep. 16, 2020, now Pat. No. Re. 48,919, which is an
(Continued)

(51) Int. Cl.
*H04L 29/06* (2006.01)
*G06F 12/14* (2006.01)
(Continued)

(52) U.S. Cl.
CPC ..... *H04L 63/061* (2013.01); *G06F 12/1408* (2013.01); *G06F 21/64* (2013.01);
(Continued)

(58) Field of Classification Search
CPC ... H04L 63/061; H04L 63/20; H04L 63/0876; H04L 63/06; H04L 9/3247;
(Continued)

(56) References Cited

U.S. PATENT DOCUMENTS 7,216,083 B2 5/2007 Parmelee et al.
7,958,364 B2 6/2011 Lee et al.
(Continued)

FOREIGN PATENT DOCUMENTS

AU 2014225984 A1 10/2015
AU 2014225984 10/2017
(Continued)

OTHER PUBLICATIONS

"Australian Application Serial No. 2014225984, Office Action dated Oct. 11, 2016", 3 pgs.
(Continued)

*Primary Examiner* — Minh Dieu Nguyen
(74) *Attorney, Agent, or Firm* — Shumaker & Sieffert, P.A.

(57) ABSTRACT

Techniques for providing data security services with respect to cloud-based services are described. Examples include a security service provider ("SSP") configured to perform or provide one or more security-related services or functions with respect to or on behalf of some other system or service. The other system or service may be, for example, a cloud-based system that provides network-accessible services. The SSP allows a user of the cloud-based service to provide and manage one or more security-related services, such as data storage, encryption, decryption, key management, and the like. By using and controlling the SSP, the user can be confident that his or her data is being securely represented and stored, even though it is being operated upon by a cloud-based service that is not under the user's control.

20 Claims, 8 Drawing Sheets

Related U.S. Application Data application for the reissue of Pat. No. 10,135,799, which is a continuation of application No. 14/940,619, filed on Nov. 13, 2015, now Pat. No. 9,742,746, which is a continuation of application No. 14/196,969, filed on Mar. 4, 2014, now Pat. No. 9,219,753.

(60) Provisional application No. 61/772,397, filed on Mar. 4, 2013.

(51) Int. Cl.

| | |
|---|---|
| ***G06F 21/64*** | (2013.01) |
| ***H04L 9/32*** | (2006.01) |
| ***H04L 9/40*** | (2022.01) |

(52) U.S. Cl.

CPC ..... *H04L 9/3247* (2013.01); *H04L 63/0428* (2013.01); *H04L 63/06* (2013.01); *H04L 63/0876* (2013.01); *H04L 63/20* (2013.01)

(58) Field of Classification Search

CPC ..... H04L 63/0428; H04L 63/0272; H04L 63/0435; H04L 63/0471; H04L 9/321; G06F 21/64; G06F 12/1408; G06F 21/6218; G06F 21/645; G06F 21/62; G06F 2212/264

See application file for complete search history.

(56) References Cited

U.S. PATENT DOCUMENTS

| | | | | |
|---|---|---|---|---|
| 8,612,349 | B1 | 12/2013 | Ledder et al. | |
| 8,776,190 | B1 | 7/2014 | Cavage et al. | |
| 8,973,119 | B2 | 3/2015 | Van Os et al. | |
| 9,165,154 | B2 | 10/2015 | Auradkar et al. | |
| 9,219,753 | B2 | 12/2015 | Fleischman et al. | |
| 9,736,127 | B2 | 8/2017 | Fleischman et al. | |
| 9,742,746 | B2 | 8/2017 | Fleischman et al. | |
| 10,135,799 | B2 | 11/2018 | Fleischman et al. | |
| RE48,919 | E | 2/2022 | Fleischman et al. | |
| 2003/0142364 | A1 | 7/2003 | Goldstone | |
| 2005/0021975 | A1 | 1/2005 | Liu | |
| 2008/0033820 | A1 | 2/2008 | Walker | |
| 2009/0268903 | A1 | 10/2009 | Bojinov et al. | |
| 2010/0287260 | A1 | 11/2010 | Peterson et al. | |
| 2010/0299313 | A1 | 11/2010 | Orsini et al. | |
| 2010/0332401 | A1 | 12/2010 | Prahlad et al. | |
| 2011/0022642 | A1 | 1/2011 | Demilo et al. | |
| 2011/0258333 | A1 | 10/2011 | Pomerantz et al. | |
| 2011/0264907 | A1 | 10/2011 | Betz et al. | |
| 2012/0079569 | A1 | 3/2012 | Mendelovich et al. | |
| 2012/0096567 | A1 | 4/2012 | Ferris | |
| 2012/0179909 | A1 | 7/2012 | Sagi et al. | |
| 2013/0007845 | A1 | 1/2013 | Chang et al. | |
| 2013/0019156 | A1 | 1/2013 | Gonser | |
| 2013/0019289 | A1 | 1/2013 | Gonser et al. | |
| 2013/0050512 | A1 | 2/2013 | Gonser et al. | |
| 2013/0067243 | A1 | 3/2013 | Tamayo-Rios et al. | |
| 2013/0145483 | A1 | 6/2013 | DiMuro et al. | |
| 2013/0159720 | A1 | 6/2013 | Gonser et al. | |
| 2013/0179676 | A1 | 7/2013 | Hamid | |
| 2013/0219456 | A1 | 8/2013 | Sharma et al. | |
| 2013/0254111 | A1 | 9/2013 | Gonser et al. | |
| 2013/0263283 | A1 | 10/2013 | Peterson et al. | |
| 2014/0019761 | A1 | 1/2014 | Shapiro | |
| 2014/0051418 | A1* | 2/2014 | van Os ..... | H04W 12/06 455/418 |
| 2014/0250491 | A1 | 9/2014 | Fleischman | |
| 2016/0080426 | A1 | 3/2016 | Fleischman et al. | |
| 2016/0127337 | A1 | 5/2016 | Fleischman et al. | |
| 2018/0234422 | A1 | 8/2018 | Odom et al. | |

FOREIGN PATENT DOCUMENTS

| | | | |
|---|---|---|---|
| CN | 1514978 | A | 7/2004 |
| CN | 101364869 | A | 2/2009 |
| CN | 105453105 | A | 3/2016 |
| EP | 2056517 | A2 | 5/2009 |
| EP | 2965258 | A1 | 1/2016 |
| JP | 2002049590 | A | 2/2002 |
| JP | 2005252384 | A | 9/2005 |
| JP | 2012518330 | A | 8/2012 |
| JP | 2012527838 | A | 11/2012 |
| JP | 2016513837 | A | 5/2016 |
| SG | 11201507023X | | 10/2015 |
| SG | 11201507023X | A | 10/2015 |
| WO | 2013029048 | A1 | 2/2013 |
| WO | WO-2013029048 | A1 | 2/2013 |
| WO | 2014138120 | A1 | 9/2014 |
| WO | WO-2014138120 | A1 | 9/2014 |

OTHER PUBLICATIONS

"Australian Application Serial No. 2014225984, Response to Subsequent Examiners Report dated May 18, 2017", 18 pgs.

"European Application Serial No. 14760367.4, Response filed Apr. 18, 2016 to Communication pursuant to Rules 161 (2) and 162 EPC dated Oct. 20, 2015", (English Translation of Claims), 11 pgs.

European Application Serial No. 14760367.4,Response to Communication pursuant to Rules 70(2) and 70a(2) EPC dated Apr. 3, 2017, 8 pgs.

International Preliminary Report on Patentability from International Application No. PCT/US2014/020411 dated Sep. 8, 2015, 4 pp.

International Search Report and Written Opinion of International Application No. PCT/US2014/020411 dated Jul. 10, 2014, 5 pp.

Kamara et al., "Cryptographic Cloud Storage", Financial Cryptography and Data Security, Springer, Jan. 25, 2010, pp. 136-149, URL: https://link.springer.com/chapter/10.1007/978-3-642-14992-4_13.

Office Action, Japanese Patent Application No. 2015-561560, Jan. 22, 2019, four pages.

Prosecution History from U.S. Appl. No. 14/196,969, now issued U.S. Pat. No. 9,219,753, dated May 30, 2014 through Aug. 14, 2015, 115 pp.

Prosecution History from U.S. Appl. No. 14/940,619, now issued U.S. Pat. No. 9,742,746, dated Dec. 18, 2015 through May 18, 2017, 115 pp.

Prosecution History from U.S. Appl. No. 14/993,331, now issued U.S. Pat. No. 9,736,127, dated Jan. 13, 2016 through Apr. 20, 2017, 97 pp.

Prosecution History from U.S. Appl. No. 15/682,061, now issued U.S. Pat. No. 10,135,799, dated Oct. 18, 2017 through Jul. 12, 2018, 72 pp.

Prosecution History from U.S. Appl. No. 17/023,040, now issued U.S. Pat. No. Re. 48,919, dated Oct. 19, 2020 through Sep. 17, 2021, 33 pp.

Search Report from counterpart Chinese Application No. 201480025250.9 dated Sep. 20, 2017, 1 pp.

U.S. Appl. No. 16/192,504, filed Nov. 15, 2018, naming inventors Fleischman et al.

"U.S. Appl. No. 14/196,969, Examiner Interview Summary dated Sep. 11, 2014", 3 pgs.

"U.S. Appl. No. 14/196,969, Final Office Action dated Feb. 2, 2015", 28 pgs.

"U.S. Appl. No. 14/196,969, Non Final Office Action dated May 30, 2014", 28 pgs.

"U.S. Appl. No. 14/196,969, Notice of Allowance dated May 8, 2015", 13 pgs.

"U.S. Appl. No. 14/196,969, Notice of Allowance dated Aug. 14, 2015", 9 pgs.

"U.S. Appl. No. 14/196,969, Response filed Mar. 31, 2015 to Final Office Action dated Feb. 2, 2015", 15 pgs.

"U.S. Appl. No. 14/196,969, Response filed Sep. 9, 2014 to Non Final Office Action dated May 30, 2014", 18 pgs.

"U.S. Appl. No. 14/940,619, Corrected Notice of Allowance dated May 18, 2017", 2 pgs.

(56) References Cited

OTHER PUBLICATIONS

"U.S. Appl. No. 14/940,619, Examiner Interview Summary dated May 24, 2016", 3 pgs.
"U.S. Appl. No. 14/940,619, Final Office Action dated Jul. 28, 2016", 21 pgs.
"U.S. Appl. No. 14/940,619, Non Final Office Action dated Feb. 16, 2016", 15 pgs.
"U.S. Appl. No. 14/940,619, Notice of Allowance dated Apr. 21, 2017", 15 pgs.
"U.S. Appl. No. 14/940,619, Notice of Allowance dated Nov. 18, 2016", 15 pgs.
"U.S. Appl. No. 14/940,619, Preliminary Amendment filed Dec. 18, 2015", 8 pgs.
"U.S. Appl. No. 14/940,619, Response filed May 16, 2016 to Non Final Office Action dated Feb. 16, 2016", 13 pgs.
"U.S. Appl. No. 14/940,619, Response filed Sep. 28, 2016 to Final Office Action dated Jul. 28, 2016", 15 pgs.
"U.S. Appl. No. 14/993,331, Final Office Action dated Jul. 28, 2016", 20 pgs.
"U.S. Appl. No. 14/993,331, Non Final Office Action dated Feb. 26, 2016", 14 pgs.
"U.S. Appl. No. 14/993,331, Notice of Allowance dated Apr. 20, 2017", 15 pgs.
"U.S. Appl. No. 14/993,331, Notice of Allowance dated Nov. 18, 2016", 15 pgs.
"U.S. Appl. No. 14/993,331, Preliminary Amendment filed Jan. 13, 2016", 3 pgs.
"U.S. Appl. No. 14/993,331, Reponse filed May 26, 2016 to Non Final Office Action dated Feb. 26, 2016", 12 pgs.
"Australian Application Serial No. 2014225984, Response filed Feb. 16, 2017 to Office Action dated Oct. 11, 2016", 14 pgs.
"Australian Application Serial No. 2014225984, Response to Subseqent Examiners Report dated May 18, 2017", 18 pgs.
"Australian Application Serial No. 2014225984, Subsequent Examiners Report dated Mar. 9, 2017", 3 pgs.
"Chinese Application Serial No. Preliminary Amendment filed Jul. 21, 2016", W/ English Claims, 11 pgs.
"European Application Serial No. 147603674, Extended European Search Report dated Sep. 7, 2016", 9 pgs.
"European Application Serial No. 14760367.4, Response filed Apr. 18, 2016 to Communication pursuant to Rules 161(2) and 162 EPC dated Oct. 20, 2015", (English Translation of Claims), 16 pgs.
"European Applicatieu Serial No. 14760367.4,Response to Communication pursuant to Rules 70(2) and 70a(2) EPC dated Apr. 3, 2017 dated Sep. 7, 2016", 8 pgs.
"International Application Serial No. PCT/US2014/020411, International Preliminary Report on Patentability dated Sep. 17, 2015", 5 pgs.
"International Application Serial No. PCT/US2014/020411, International Search Report dated Jul. 10, 2014", 2 pgs.
"International Application Serial No. PCT/US2014/020411, Written Opinion dated Jul. 10, 2014", 3 pgs.
"Singapore Application Serial No. 11201507023X, Response filed Aug. 25, 2016 to Search Report and Written Opinion dated May 10, 2016", 11 pgs.
"Singapore Application Serial No. 11201507023X, Search Report and Written Opinion dated May 10, 2016", 10 pgs.
"Singapore Application Serial No. 11201507023X, Written Opinion dated Nov. 3, 2016", 5 pgs.
Kamara, et al., "Cryptographic Cloud Storage", Published in "Financial Cryptography and Data Security" Springer,, (2010), 136-149.
"Chinese Application Serial No. 201480025250.9, Office Action dated Oct. 10, 2017", w/English Translation, 18 pgs.
U.S. Appl. No. 14/196,969, filed Mar. 4, 2014, Systems and Methods for Cloud Data Security, U.S. Pat. No. 9,219,753.
U.S. Appl. No. 14/940,619, filed Nov. 13, 2015, Systems and Methods for Cloud Data Security, U.S. Pat. No. 9,742,746.
U.S. Appl. No. 14/993,331, filed Jan. 12, 2016, Systems and Methods for Cloud Data Security, U.S. Pat. No. 9,736,127.
"Chinese Application Serial No. 201480025250.9, Response filed Feb. 22, 2018 to Office Action dated Oct. 10, 2017", W/English Claims, 23 pgs.
"Japanese Application Serial No. 2015-561560, Office Action dated Apr. 3, 2018", w/ English translation, 8 pgs.

* cited by examiner

SYSTEMS AND METHODS FOR CLOUD DATA SECURITY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM

[This application is a continuation of U.S. patent application Ser. No. 14/940,619, filed on Nov. 13, 2015, and issued on Aug. 22, 2017 as U.S. Pat. No. 9,742,746, which is a continuation of U.S. patent application Ser. No. 14/196,969, filed on Mar. 4, 2014, and issued on Dec. 22, 2015 as U.S. Pat. No. 9,219,753, which claims the benefit of priority to U.S. Provisional Application Ser. No. 61/772,397, filed on Mar. 4, 2013. The contents of the above applications are incorporated herein by reference in their entireties.] *More than one reissue application has been filed for the reissue of U.S. Pat. No. 10,135,799. This application is a continuation reissue of application Ser. No. 17/023,040, filed Sep. 16, 2020, now U.S. Pat. No. RE48,919 E, which is a reissue application of application Ser. No. 15/682,061, filed Aug. 21, 2017 and now U.S. Pat. No. 10,135,799 issued on Nov. 20, 2018, which is a continuation of U.S. application Ser. No. 14/940,619, filed on Nov. 13, 2015, now U.S. Pat. No. 9,742,746, which is a continuation of U.S. application Ser. No. 14/196,969, filed on Mar. 4, 2014, now U.S. Pat. No. 9,219,753, which claims priority to U.S. Provisional Application No. 61/772,397, filed on Mar. 4, 2013.*

FIELD OF THE INVENTION

The present disclosure relates to systems and methods for computer security and, more particularly, to systems and methods for providing data security with respect to cloud-based services.

BACKGROUND

A common refrain heard among customers when evaluating new critical Software as a Service (SaaS) platforms is a lack of trust in the service. For example, if a cloud storage system is used, the customer must trust the service provider to provide adequate safeguards and security measures to protect customer data stored by the provider. This lack of trust creates a significant adoption barrier for new services. Service providers must combat this by articulating how secure their service is and attempting to prove it to customers in a myriad of ways (certifications among others).

BRIEF DESCRIPTION OF THE DRAWINGS

Preferred and alternative examples of the present invention are described in detail below with reference to the following drawings.

DETAILED DESCRIPTION

Figure 1:
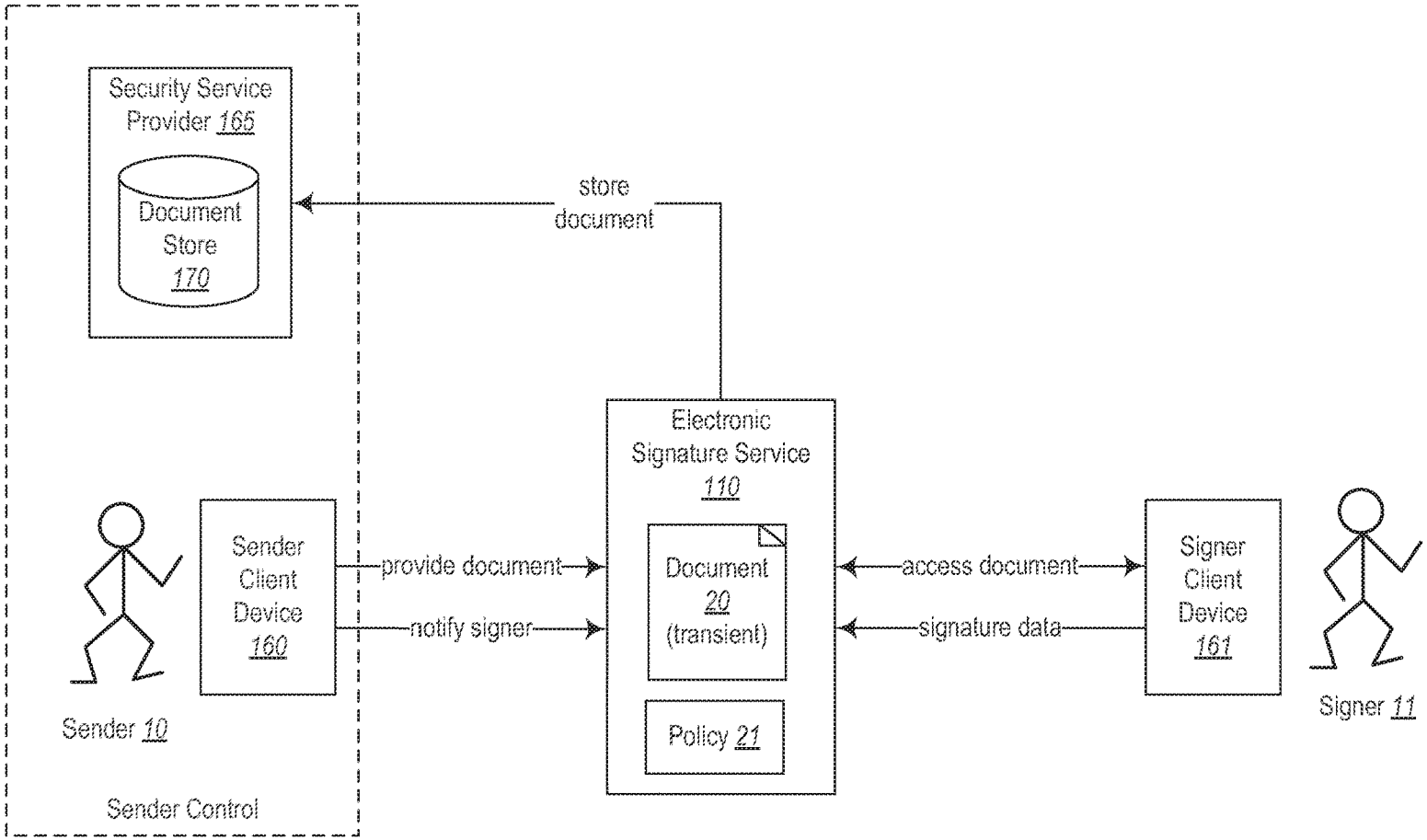
FIG. 1 illustrates an example block diagram of a first example embodiment of security service provider.

Embodiments described herein provide enhanced computer- and network-based systems and methods for providing data security with respect to remote computing services, such as cloud-based services. Example embodiments provide a security service provider ("SSP") configured to perform or provide one or more security-related services or functions with respect to or on behalf of some other system or service. The other system or service may be, for example, a cloud-based system that provides network-accessible services. The SSP allows a user (sometimes referred to as a "customer") of the cloud-based service to provide and manage one or more security-related services, such as data storage, encryption, decryption, key management, and the like. By using and controlling the SSP, the user can be confident that his data is being securely represented and stored, even though it is being operated upon by a cloud-based service that is not under the user's control.

Cloud-based systems and services include arrangements of software, platforms, and/or infrastructure that are accessed via a network, such as the Internet or a private network. Typically, cloud-based services are provided by distinct external entities, so that a given business unit or other organization can access the benefits of the service (e.g., scalability, accessibility, fault tolerance) without needing itself to manage the required computing infrastructure. The described techniques employ a "hybrid" approach, in which the customer retains control over some security-related functions, such as encryption/decryption, data storage, or the like. The extent and conditions under which the customer is involved in performing such functions is controlled by a policy-based mechanism, as described in more detail below.

The described techniques can be employed to protect data used in a cloud service. In one example, a user continues to leverage the cloud service just as they do today, but combined with at least some of the techniques described herein. These techniques are transparent to the user of the system but protect data used in the cloud service such that an organization can claim that they are protected even if they do not trust the cloud service and/or the service has a security incident in the future. This trust is verifiable both inside and out.

The described techniques are applicable in a wide variety of contexts. They can be used to provide security services with respect to various types or forms of remote systems or services. Below, the techniques are described as being deployed with respect to an electronic signature service "(ESS"). Using an SSP in conjunction with an ESS is but one possible deployment scenario, and should not be interpreted as limiting. In particular, the SSP can be used with other types of remote services, including any type of software as a service, cloud storage services, messaging services, financial services, customer relationship management services, and the like. The SSP can generally be used in conjunction with any digital transaction services, including electronic signature services, real estate transaction services, online purchasing systems, payroll systems, procurement systems, human resources systems (e.g., time tracking, billing systems), and the like.

The example ESS is configured to facilitate the creation, storage and management of documents and corresponding electronic signatures. Using the ESS, a first user (a "sender") can provide or upload a document to be signed ("a signature document"), while a second user (a "signer") can access, review and sign the uploaded document. The SSP can be used by the ESS to securely store the document (FIG. 1) or to provide encryption/decryption services for the document (FIG. 2). FIGS. 3 and 4 provide additional details regarding the use of an example SSP to provide encryption/decryption services on behalf of a generalized cloud service.

Cloud Data Escrow

Figure 2:
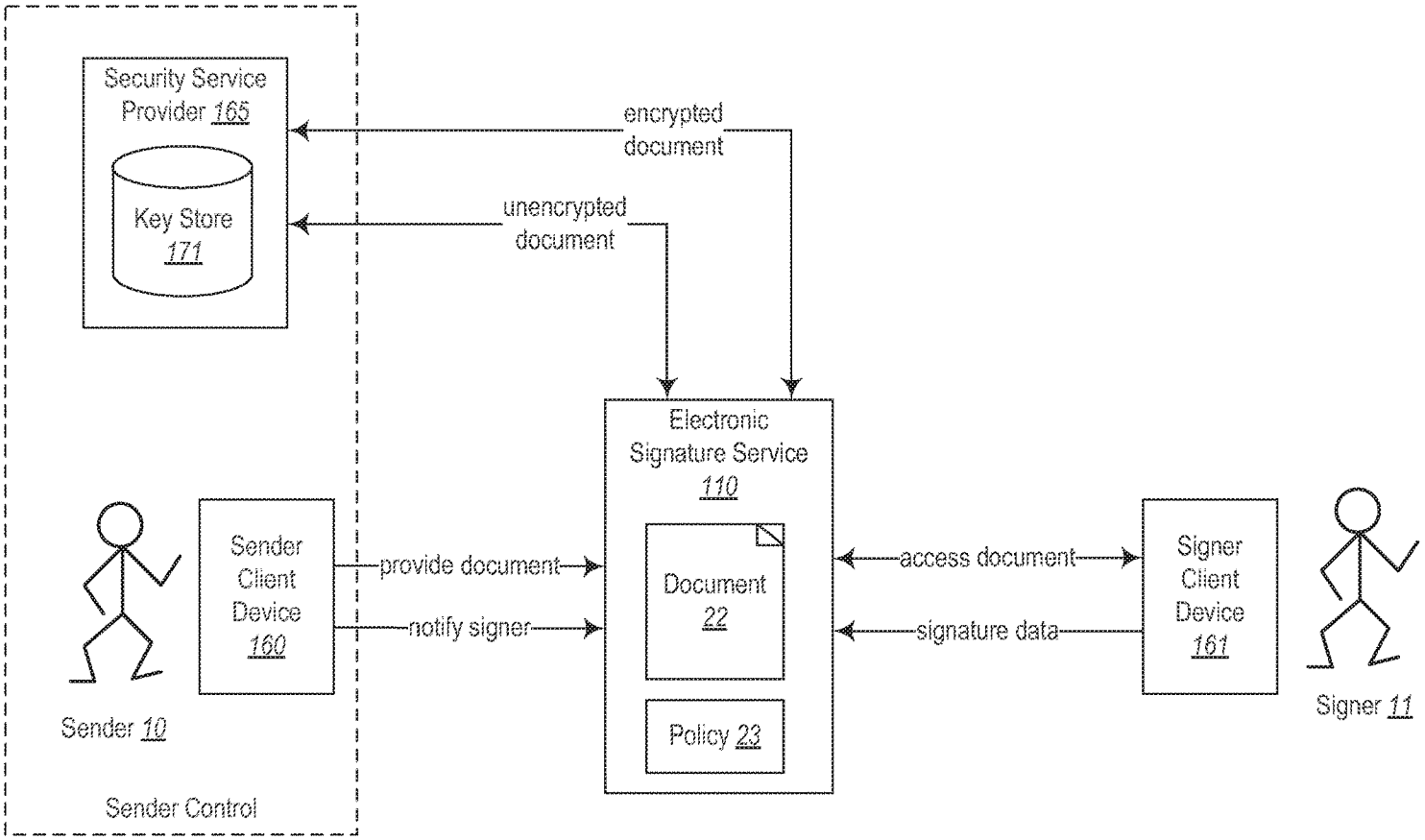
FIG. 2 illustrates an example block diagram of a second example embodiment of a security service provider.

FIG. 1 illustrates an example block diagram of a first example embodiment of security service provider. FIG. 1 illustrates a "cloud data escrow" approach in which a sender uses an SSP to securely store documents or other data. In the example shown in FIG. 1, an SSP 165 operates with respect to an ESS 110. The ESS 110 is utilized by a sender 10 and a signer 11 to initiate an electronic signing of a signature document 20. The SSP 165 includes a document store 170 that is used to securely store the electronic signature document 20. The SSP 165 is under the control of the sender 10 (or the sender's organization), such that signature documents processed by the ESS 110 on behalf of the sender 10 are always under the control of the sender 10 or his corresponding organization.

In the illustrated scenario, the sender 10 operates a sender client device 160 in order to provide (e.g., upload, transmit) an electronic document 20 (e.g., an invoice, contract, or agreement) to the ESS 110. The ESS 110 then transmits the electronic document 20 to the SSP 165, where it is securely stored in the document store 170. After storage by the SSP 165, the ESS 110 deletes any copies of the document 20.

The decision by the ESS 110 to use the security service provider 165 is based on a policy 21. Typically, the policy 21 is established by the sender 10 and controls or otherwise causes the ESS 110 to rely on the SSP 165 for document storage functions. The policy 21 defines the storage location and operation to use for the signature document. Policies may be specific to particular documents, users, organizations, or some combination thereof.

The signer 11 then accesses the document 20. Typically, the sender 10 notifies the signer 11, such as by causing the ESS 110 to send to the signer 11 a message (e.g., an email) that includes a reference (e.g., a URL) to the document 20. The signer 11 operates a Web browser or other client module executing on the signer client device 161 to access and review the document 20. The ESS 110 retrieves the document from the SSP 165 and provides it (or a representation thereof) to the signer client device 161 for presentation. When the document 20 has been reviewed to the satisfaction of the signer 11, the signer attaches (or provides an indication or instruction to attach) his electronic signature to the document 20. Once the signing has been completed, the ESS 110 stores the document 20 in association with signature data and any other evidence of the signing that needs be retained, such as user information, timestamps, and the like. After completion of the signature process, the ESS 110 deletes any copies of the document 20.

In the embodiment of FIG. 1, the SSP is responsible for storing data on behalf of the cloud service. Such an embodiment may also be referred to as a Cloud Storage Appliance ("CSA"). The CSA responds to legitimate requests for data in order to provide service to the user who is consuming the application. The core observation is that data is in the custody of the owner of the CSA itself, not the cloud service operator.

For simplicity, further details related to the CSA will be described with respect to a simple cloud service scenario: a user who is trying to first store and then access a document housed in a cloud service. It can be appreciated that a document storage and retrieval system is merely one example deployment for the CSA. It may also or instead be used in other contexts, such as the electronic signature context described elsewhere herein.

The CSA can store documents on behalf of the cloud service. The goal of this appliance is to outsource storage of the document itself such that data at rest is never in the cloud service; it is in the storage appliance, under the control of the customer. Data "at rest" typically includes data that is persistently or statically stored (e.g., on disk, tape, or other persistent medium). In contrast, data "in flight" or "in use" typically includes volatile, dynamic, and/or active data, such as data that is in volatile or working memory of a computing system, data that is being processed by a processor, data that is being communicated from one place to another, or the like. Data in flight may in some circumstances specifically refer to data that is actively traversing a network or other non-persistent communication medium (e.g., an IO bus, a system bus).

In typical embodiments, the customer can define a policy which controls when a piece of data is stored at rest in a cloud service and, when defined appropriately, will store the data on an external storage device under the control of a customer. The cloud storage appliance is located in the customer datacenter and in their control at all times.

In one example process flow, the customer first creates an account in the cloud service for their organization (i.e., they "sign up" for the cloud service). Then, the customer defines an organizational policy that applies to some set of users (some or all). This policy defines when the data is to be stored at rest in the cloud service in contrast to when it is to be stored at rest in the CSA.

A user in the organization next proceeds to use the cloud service as they normally would. For example, they upload a document to the service. The example document is processed normally. When processing is complete and the cloud service goes to save the document, the organizational policy is consulted. Should the policy stipulate that the current state of the document yields saving in the cloud, the document is stored in the cloud. Should the policy stipulate that the current state of the document yields saving the document on the customer CSA, the document is sent over a digital medium to the CSA for storage.

Upon successful save to some location, should the document reside in another location, that location is notified that the document is no longer in their possession and they are to remove it from storage. For example, if the document was stored in the cloud service but due to state change is now to be saved in the CSA, once successfully saved to the CSA, the cloud service is notified it is to delete this document so as to be conformant to organizational policy.

As further changes to the document are made and the state advances, at each save event to storage the policy is again consulted and the document is stored in the correct location. This might yield the document being saved in a different location as time progresses, as policy dictates.

The above processing progression continues until such time as the document is complete, when the document is saved for the final time. Again, this final save happens in the appropriate location based upon organizational policy. This final event is merely another instantiation of the logic invoked above (i.e., performing the appropriate operation based on the organizational policy), it is called out as a separate step here for completeness. In some cases, the policy may specify cleanup or finalization operations that are to be performed in response to document completion.

The definition and processing of a policy defines the save-location of a given data element. In this approach, the policy may, as one example, be represented as a list of save policy vectors, each of which is formed with the following properties:

| |
|---|
| [data type,<br>data state or data operation,<br>data escrow location] |

Document states or operations may include any (possibly domain- or application-specific) conditions or functions that are present or performed with respect to a particular data item. Example states may be generic in that they can apply to a wide variety of applications, such as new document, imported document, deleted document, open document, closed document, or the like. Application-specific states may be, in the electronic signature context for example, new document, sent document, viewed document, signed document, completed document. Some embodiments may use data operations/functions in addition to, or instead of, data states. Example generic operations may correspond to traditional file system operations, such as new, open, close, view, delete, or the like. In some embodiments, the SSP may externalize the determination of whether a particular policy is triggered. For example, the SSP may rely on or otherwise interact with a policy manager (e.g., operated by the customer) that is configured with sufficient domain- or application-specific knowledge to decide when a particular policy is triggered.

In a preferred embodiment, a data escrow location references a globally-defined escrow location vector with the following properties:

| |
|---|
| [data escrow location id,<br>data escrow location type,<br>data escrow location endpoint URL,<br>other data escrow location properties] |

Some embodiments apply the above data structures to a given customer of a cloud service in the following manner. Each customer of the cloud service is given the opportunity to define their data save locations. The initial save location is the cloud service. A customer can associate one or many CSAs with their account, each of which creates another escrow location vector. Each escrow location vector is persisted as a property of the customer account.

Also, each customer of the cloud service is given the opportunity to define their storage policy. In a preferred embodiment, a policy consists of a list of save policy vectors (see above) of length greater than or equal to zero. Each policy is defined and added to the aforementioned list, and saved as a property of the customer themselves. A property must reference a previously-defined data save location vector by some unique identifier.

Each time a data element (e.g., a document) is saved within the context of this customer, the policy for the customer is consulted. The policy list is traversed and the match is sought out where a match is a policy vector with a state which matches that of the data being saved. The determined policy is then processed and invoked. If no policy is found, the default save location of the cloud service is used. If a matching policy is found, the specified escrow location vector reference is extracted from (or located or otherwise determined based on) the policy rule, and then the escrow location vector itself is obtained from the customer. That location is now passed back to the previous algorithm and the save method is invoked for this location.

Note that while the previous scenarios all relied upon appliances located in a customer datacenter, other deployments might yield an identical appliance with identical data flows housed in a third-party datacenter. For example, a third-party organization may provide storage services to a customer such that the cloud service provider does not have access to the data but the customer does not have to manage the CSA themselves. In so doing, the customer can safely assume that the data is not in control of the cloud service operator but rather in the hands of a carefully selected partner who specializes in such storage. This deployment methodology leverages all of the same methodologies from what is above, it is simply deployed in a different configuration.

The following features or aspects are understood to be encompassed by the CSA. First, the described techniques include a new device, referred to as a cloud storage appliance (CSA), which stores data on behalf of a cloud service in a customer environment, such that the customer maintains control of all data stored in the CSA rather than the operator of the cloud service.

The described techniques also include a process by which a customer account in a cloud service can be told of a series of CSAs which are owned by the customer and, in turn, can be leveraged for the saving of data in the context of the customer.

The described techniques further include a method for defining a policy to decide when a cloud service should escrow data to an external storage system and when a cloud service should store a document to an internal storage system.

The described techniques also include a process tier defining a policy which decides when to escrow data based upon criteria which relate back to the transitioning state of the data, such as completion of a document, which is rooted in a user activity on the cloud service.

The described techniques further include a process for providing data escrow services to a cloud service via CSA, such that execution of some operation and a data state change which results, the data is transferred to the appropriate storage medium, which may be either a cloud service or the aforementioned CSA, and removed from the other previous storage location.

The described techniques also include a process for removing data from a cloud service such that, upon successful escrow of the data from a cloud service, all copies of the data are removed from the cloud service, including from spinning media in the cloud service, removal from backup devices/tapes, and so on.

Cloud Data Protection

FIG. 2 illustrates an example block diagram of a second example embodiment of a security service provider. FIG. 2 illustrates a "cloud data protection" approach in which the SSP provides encryption/decryption services for documents and other data. FIG. 2 again depicts an SSP 165 operating with respect to an ESS 110. This example differs from that of FIG. 1 in that here the ESS 110 is responsible for managing storage of signature documents, and relies on the SSP 165 to provide encryption-related services with respect to stored documents.

In FIG. 2, a sender 10 uses a client device 160 to provide a signature document 22 to the ESS 110. The ESS 110 consults a policy 23 to determine to use the SSP 165 to encrypt the document 22. The document 22 is provided by the ESS 110 to the SSP 165 in unencrypted form. The SSP 165, using a key from a key store 171, encrypts the document 22 and transmits it back to the ESS 110. The ESS 110 then deletes an unencrypted version of the document 22, such as the copy that was initially provided by the sender 10.

When the signer 11 accesses the document 22, the ESS 110 provides the encrypted document 22 to the SSP 165 for decryption. The SSP 165 decrypts the encrypted document 22 and returns an unencrypted version for access by the signer 11. When the signer 11 signs the document 22, any signature data may also be encrypted in concert with the SSP 165.

In this example, the document 22 is shown as residing within the ESS 110. In other embodiments, the document 22 may be stored in a remote, cloud-based storage service. Such a storage service may be operated by the sender (or his organization) or some third party.

In the embodiment of FIG. 2, the SSP is responsible for providing encryption/decryption services to the cloud service. Such an embodiment may also be referred to or based on a Cloud-First Hardware Security Appliance ("HSA"). The HSA is an on-premise appliance that stores keys and performs cryptographic operations when appropriate over data housed by a cloud service. The HSA may be designed "on top of" traditional hardware security module ("HSM") technology using new approaches to protect critical data stored on cloud systems.

Traditional HSMs provide the ability to securely store a key while an application can continue to leverage the key for operation of the application. The canonical example of traditional HSM use in an organization today is storage of a critical key used for signing transactions. In this traditional HSM use, the key would be stored on the device and only on the device. Access to the traditional HSM would be limited to a very narrow set of individuals and even their access is restricted to only those operations required for successful management and operation. When the key housed by the device is needed, the operation requiring the key is securely given to the device along with any required data. The traditional HSM performs the operation and returns the result to the caller.

The described techniques evolve the HSM for use with a cloud service. At least some HSAs are implemented by extending the operation of an HSM in the manner described herein. The described techniques employ such a device to protect data in a cloud service. In doing so, the cloud service application does not have access (e.g., to read data as plain text) to the data it houses as the data is protected by a key stored in the HSA. The HSA is in turn protected by the customer on premise and employs a variety of methods to prevent on premise users as well as the cloud provider from accessing the key inappropriately. The result is a system in which the customer can use the cloud service normally, even though the cloud service houses data that is opaque to the service itself.

For simplicity, the operation of the HSA will be described with respect to a simple cloud service scenario: a user who is trying to first store and then access a document housed in a cloud service. It can be appreciated that a document storage and retrieval system is merely one example deployment for the HSA. It may also or instead be used in other contexts, such as the electronic signature context described elsewhere herein.

The HSA may provide or be configured or used in at least one of two distinct modes of operation. In a first mode, the cloud service reaches out to the HSA and asks it to perform cryptographic operations to sensitive information. In a second mode, the user interacts directly with the HSA and has the HSA perform cryptographic operations, working in tandem with the cloud service to provide the desired functionality to the user. For each of these modes, the following sections first present a process for injection (e.g., import, upload, initial storage) of a new document into the system, then a process for viewing or otherwise accessing the encrypted document, and finally a security claim which can be made based on these flows.

HSA First Mode: Cloud Retrieval of the Decrypted Document

The first mode of operation provides a secure mechanism by which the cloud service can store and retrieve a document while it is opaque to the cloud in storage.

Figure 3A:
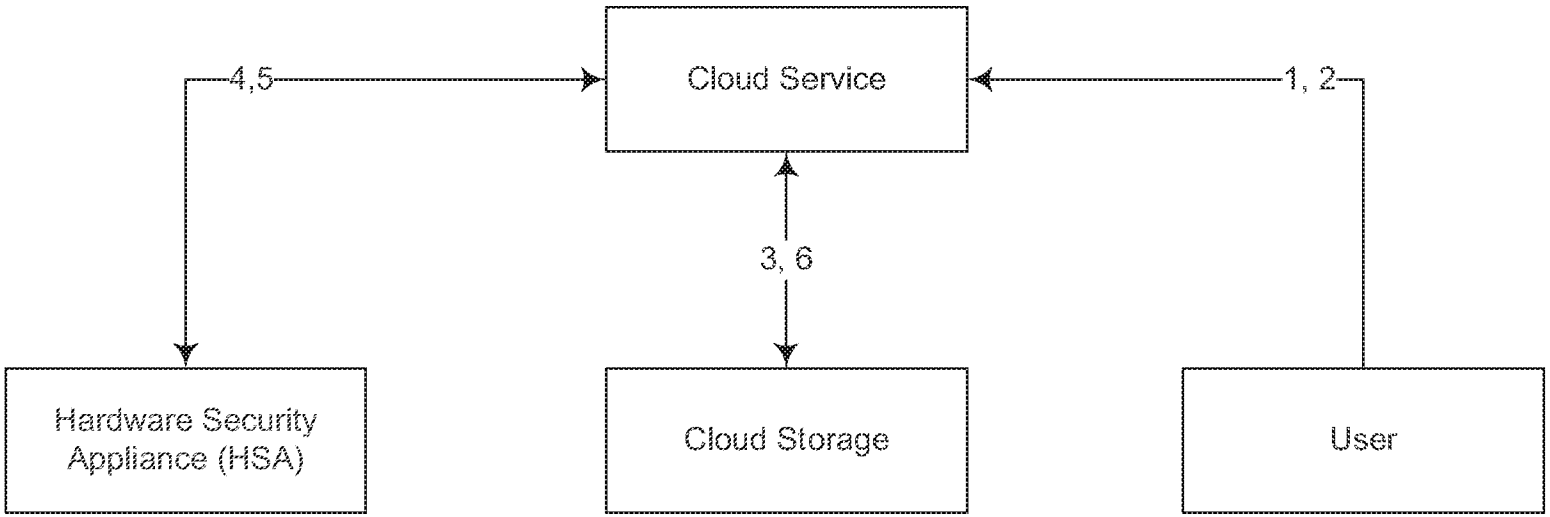
FIGS. 3A and 3B are data flows for storing and viewing data according to a first mode of operation of the second example embodiment of the security service provider.

FIG. 3A illustrates a data flow for importing, saving or otherwise introducing a new document into the system. In operation 1, a user goes to a website hosted by the cloud service. In operation 2, the user uploads the document to the website. In operation 3, the cloud service behind the website checks a policy and determines that the user is using a key stored by an HSA to encrypt the document. The policy may be similar to those described above, with respect to the cloud data escrow approach. In operation 4, the service communicates with the HSA, requesting that the HSA encrypt the document. In operation 5, the HSA responds with the encrypted form of the document along with metadata about the performed encryption operation, including one or more items such as key ID used, when encrypted, user encrypted for, and endpoint information about the HSA itself. In operation 6, the cloud service stores the encrypted document, along with metadata returned from the HSA.

Figure 3B:
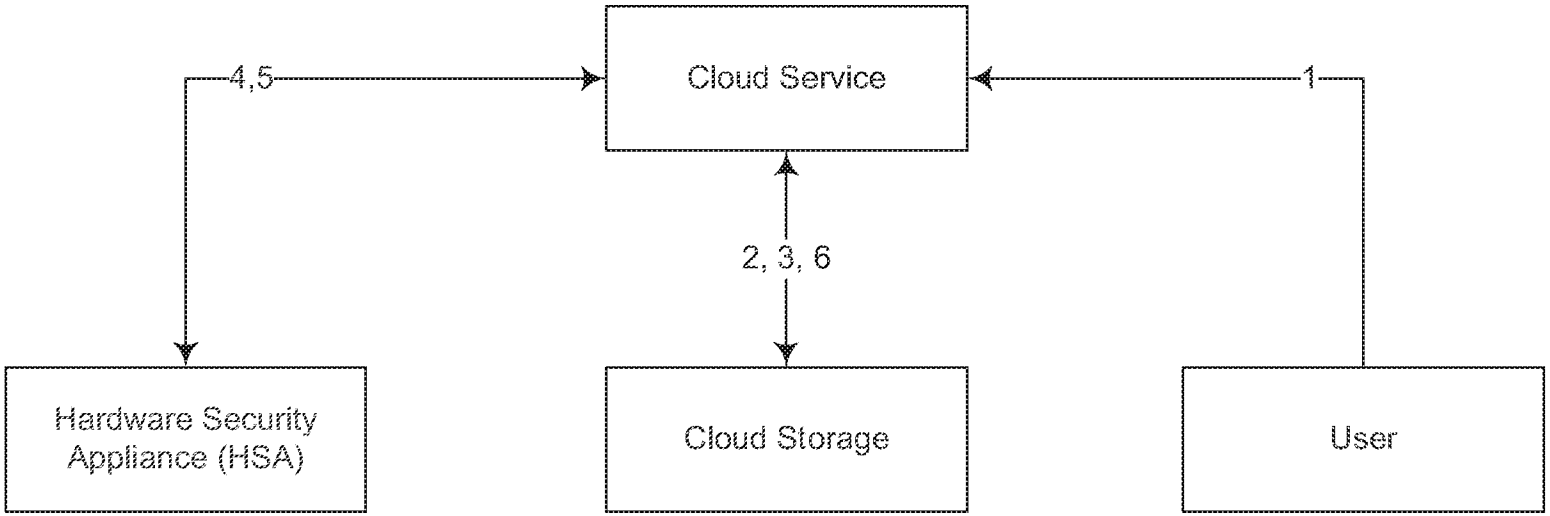

FIG. 3B illustrates a data flow for viewing the document stored as described in FIG. 3A, above. In operation 1, the user access the website hosted by the cloud service and selects the document they wish to view. In operation 2, the cloud service retrieves the encrypted document from the cloud storage backend. In operation 3, the cloud service examines the metadata attached to the document and sees it is encrypted by the specified HSA, located at the following endpoint, using the specified key ID.

In operation 5, the cloud service makes a synchronous call to the HSA over the network, including the encrypted document obtained from the cloud service backend (together with relevant metadata), and asks the HSA to decrypt the data for the user. Included in this request is information to identify the user.

In operation 6, the HSA inspects the request and decides if the request is valid. If so, the HSA decrypts the document and returns it to the cloud service. If not the HSA will deny the request to the cloud service and the user operation will in turn be denied.

In operation 7, using this unencrypted version of the document, the cloud service now provides the user with the requested document and associated functions.

Note that the document is never persisted to the cloud service in an unencrypted form. It only passes through the cloud service in an unencrypted form, never being written to any persistent storage. Accordingly, a security claim that can be made in this scenario is that the data is encrypted at rest with a key not known to the cloud service provider.

HSA Second Mode: Local Access of the Decrypted Document

The second mode of operation provides a secure mechanism by which the cloud service can facilitate saving and showing the user the document without ever seeing a copy of the document, even transiently.

Figure 4A:
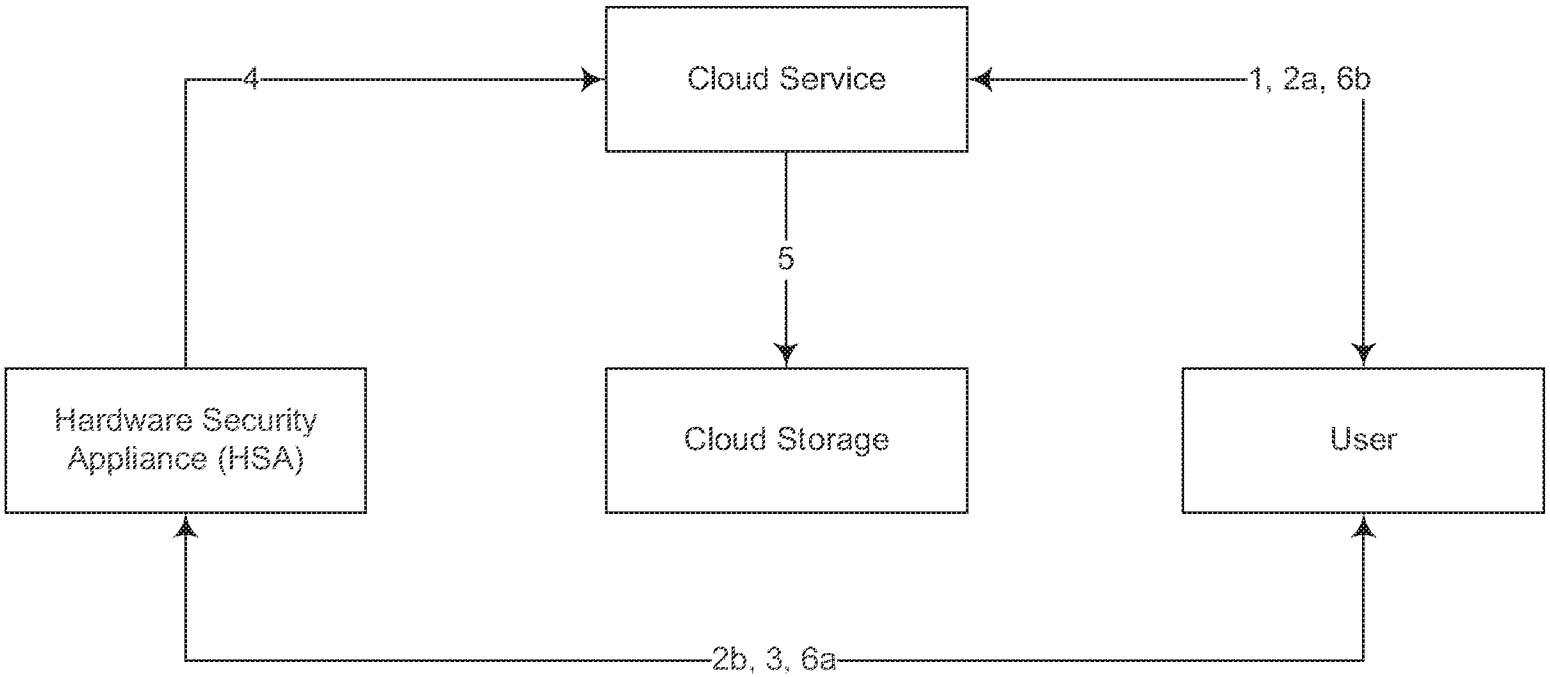
FIGS. 4A and 4B are data flows for storing and viewing data according to a second mode of operation of the second example embodiment of the security service provider.

FIG. 4A illustrates a data flow for importing, saving or otherwise introducing a new document into the system. In operation 1, the user goes to the website in front of the cloud service and indicates that they wish to save the document. Next, the website redirects the user to the HSA. Specifically, in operation 2a, the cloud service website redirects the user via a redirect verb (e.g., an HTTP 302). In operation 2b, the user lands on a page hosted by the HSA.

In operation 3, the user uploads the document directly to the HSA. The HSA selects the appropriate key and encrypts the document in accordance with the local policy. Next, in operation 4, the HSA uploads the encrypted document to the cloud service. In response, in operation 5, the cloud service stores the document in to cloud storage.

The user is next redirected back to the cloud service; the operation is complete. Specifically, in operation 6a, the HSA redirects the user via a redirect verb (e.g., an HTTP 302). In operation, 6b, the user lands on a page hosted by the cloud service that indicates the upload was completed successfully.

Figure 4B:
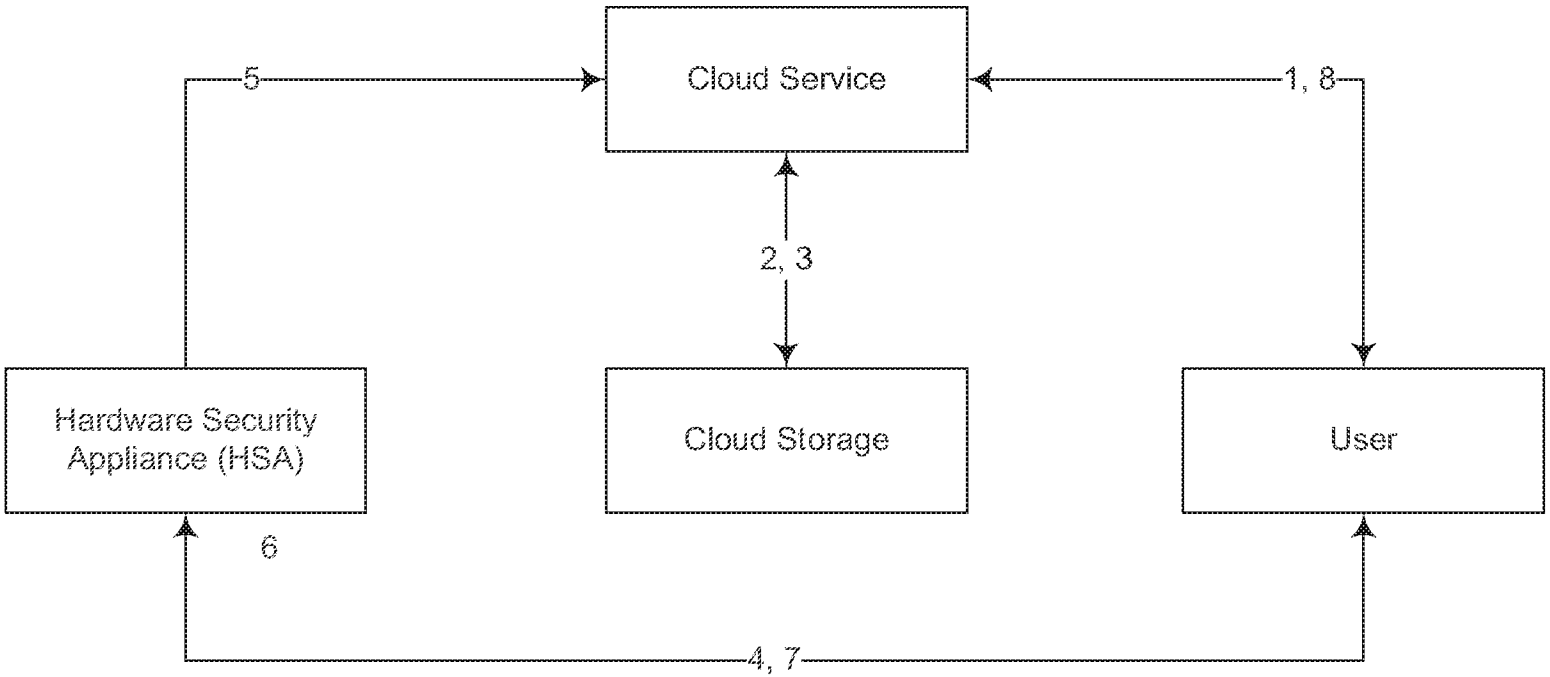

FIG. 4B illustrates a data flow for viewing the document stored as described in FIG. 4A, above. In operation 1, the user accesses the website in front of the cloud service and indicates they wish to open the document. In response, in operation 2, the cloud service retrieves the encrypted document from the storage system in the service. In operation 3, the service inspects the document and determines that the document is encrypted with a key ID found on the specified HSA.

In operation 4, the user is now redirected to an endpoint hosted on the specified HSA, including with this redirect the pointer to the document itself and the key identification information so the HSA knows which key was used to encrypt this document.

In operation 5, the HSA retrieves the document from the cloud service. In operation 6, the HSA makes a policy decision regarding whether this user is allowed to access this document based upon specified enterprise policy and user-supplied enterprise authentication materials.

In operation 7, if the aforementioned check passes, the document is decrypted by the HSA and it is provided back to the user. In operation 8, after interacting with this document, the user is redirected back to the cloud service. If the document was modified it is encrypted by the HSA and sent back to the cloud service for storage along with the associated metadata.

In the above-described scenario, a security claim that can be is that the data is encrypted both at rest and in flight by the cloud service provider and is never seen by the cloud service in an unencrypted form. One requirement in satisfying such security claims is ensuring that sensitive cryptographic operations are only performed for legitimate requests. The HSA may be equipped to support an extensive set of policy capabilities to ensure only legitimate requests are serviced. These capabilities may include: (1) Release with secret: If the specified shared secret is provided back to the appliance, then the document is to be released to the caller; and (2) Release for user: If the user successfully authenticates against the HSA using their corporate credentials, and the user is given access to the document, the document is to be decrypted by the HSA. It can be appreciated that this list of capabilities may grow in the fullness of time as additional scenarios are vetted and mapped to individual technical requirements.

The HSA in some embodiments only performs cryptographic operations for the necessary scenarios. In the absence of this protection, a malicious cloud operator could simply ask for a given blob (e.g., encrypted document) to be decrypted by the HSA. These methods must therefore be protected while not impeding upon the user activities flowing through the system.

In addition, the use of cryptography should not lend itself to attacks against the key via observation of many cryptographic operations (which the cloud may do over the course of time). While the underlying cryptographic algorithms tend to protect against this, additional protections such as regular key rotation may be employed.

Some embodiments also protect data based on entry into a given or specified state, using at least some of the techniques outlined above. This approach is sometimes referred to as "blackout," as this causes the cloud to, conceptually, black out and never be able to obtain the contents of a given data element in the service.

Again using the example of document storage, imagine one wishes to change the access policy for a document element as the state of that document changes. For example, imagine a document is accessible by a cloud service for the duration of time the document is being edited, however, once the document is marked completed, the document is to be expunged from the cloud service. This could be achieved by merely deleting the document from the cloud service. However, one can appreciate that such delete operations are non-trivial when one considers the number of places the cloud service vendor might have stored the document and the difficulty in reaching all of those places spinning media, backup tapes, and so on).

This problem can be solved by leveraging the techniques outlined above. First, the document is initially saved to the cloud service. At the time of save, the customer record is consulted and a policy indicates that the customer wants "documents opaque to cloud on completion" to be invoked. The document, when saved this first time, is passed to the HSA for encryption and the policy of "opaque to cloud on completion" is noted. The HSA encrypts the document with some key and then returns the encrypted document to the cloud service. The cloud service saves this document to the cloud service storage system.

Each time the document is accessed, the document is passed to the HSA for decryption. Without question, the HSA decrypts the document. Each time the document state is changed, the HSA is notified of the status change.

At some time in the future, the document is completed. When the HSA is notified of this status change to completed, it notes that this document is now completed in the metadata of the document. This is persisted as part of the document itself in the storage medium using cryptographic technology, leveraging the HSA keys, which prevents it from being altered.

Next time a user goes to open the document, the cloud service again provides the document to the HSA. Now, however, the HSA may apply a more stringent policy to decrypting the document, such as "no one may open this document." This capability offers the ability to functionally render the document in the cloud service useless as the holder of the key, the HSA, will refuse to perform decrypt operations for any requester of the document. The cloud service may now also optionally delete the document for housekeeping purposes as its leisure.

The above procedure allows us to render a copy of a critical piece of data in a cloud service useless, functionally allowing the user to "delete" the data from the cloud service in this way, without requiring challenging technical tricks to be implemented by the cloud service.

Note that while the previous scenarios all relied upon appliances located in a customer datacenter, other deployments might yield an identical appliance with identical data flows housed in a third party datacenter. For example, in an alternative embodiment a third party organization provides key services to a customer such that the cloud service provider does not have access to the key material but the customer does not have to manage the HSA themselves.

The following features or aspects are understood to be encompassed by the HSA. First, the described techniques include a process for storing data in a cloud service such that the cloud service does not have access to the data itself while the data is at rest.

The described techniques further include a process for storing and accessing data in a cloud service such that the user can store and access the data without friction but without exposing the key to the cloud service.

The described techniques also include a process for accessing data in a cloud service that is protected by a foreign key, and the details of that key relationship are annotated on the data itself, but the key is not exposed to the service.

The described techniques further include a process by which a cloud service can obtain an encrypted or decrypted version of a document on behalf of a user without the service ever gaining access to the key material used to encrypt or decrypt the document.

The described techniques also include a process by which an enterprise can control access to a cryptographic operation to encrypt or decrypt a document that is to be stored in a cloud service with enterprise policy and enterprise credential materials which cannot be subverted by the cloud service.

The described techniques further include a process by which a user requesting a cryptographic operation to be performed with a specific key is allowed to perform the cryptographic operation.

The described techniques also include a process by which a cloud service can store and serve an encrypted document without ever gaining access to the decrypted document, either at rest or in flight.

The described techniques further include a process by which a user can save and access a document which is stored in a cloud service such that the cloud service never has access to the unencrypted document, either at rest or in flight.

The described techniques also include a process by which a cloud service can, upon being asked to save a document, redirect the user with the document to an on-premise HSA which will in turn encrypt the document using the appropriate key, then sending the encrypted document to the cloud service.

The described techniques further include a process by which a cloud service can, upon retrieving a document from the storage system, inspect the policy on the document and redirect the user to the HSA which houses the key for the document and performs cryptographic operations using this key.

The described techniques also include a process by which a HSA can be presented with an encrypted data on behalf of a user, along with metadata about the data, in addition to the user credential materials themselves; the HSA then makes a policy decision as to whether the operation is allowed and, if so, performs the cryptographic operation for the user.

The described techniques also include a process for providing a cloud service "by proxy" through an HSA for a specified user, after completion of the aforementioned cryptographic operation, such that the user can interact with the data as if it were not encrypted at all locally on the HSA, but without ever disclosing the unencrypted version of the data back to the cloud service.

The described techniques further include a process for allowing a cloud service to allow a user to functionally delete a data element from a cloud service via the restriction of critical decryption operations on the aforementioned HSA to all users, thereby rendering the cloud service copy of this data useless, even if not fully deleted as the user desired. This process or condition may be referred to as "blackout."

Note that the above-described "cloud data escrow" and "cloud data protection" approaches are not exclusive. That is, in some embodiments, the SSP may be configured to perform both cloud data escrow (storage management) and cloud data protection (key management) depending on specified policies. For example, a given organization could specify policies that cause the SSP to perform storage on behalf of a first cloud-based service while providing encryption services on behalf of a second cloud-based service. The determination of which services the SSP provides may be based on various factors, including one or more of user identity, business rules, service provider identity, geographic location (e.g., to comply with local legal requirements), or the like.

Example Implementation

Figure 5:
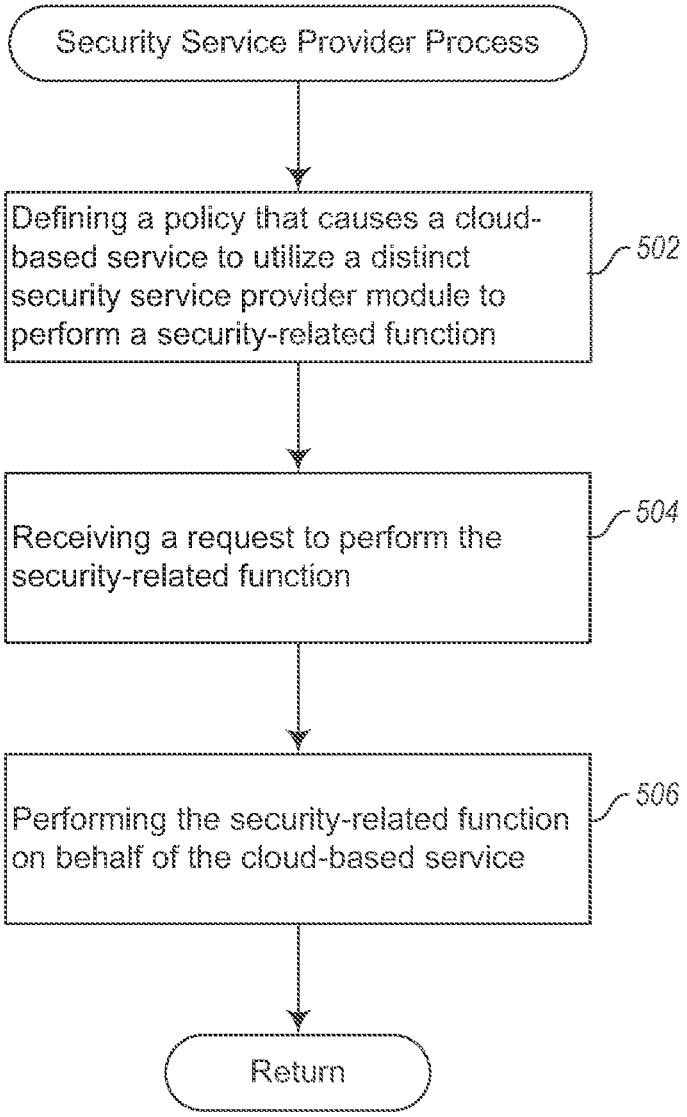
FIG. 5 is a flow diagram illustrating operations performed by an example security service provider.

FIG. 5 is a flow diagram illustrating operations performed by an example security service provider. The illustrated operations may be performed by a generalized SSP, a CSA, an HSA, or similar described module, device, or system described herein.

The process begins at block 502, where it defines a policy that causes a cloud-based service to utilize a distinct security service provider module to perform a security-related function. Example policies are described above. Defining the policy may include receiving a policy definition from a user, such as via an interactive graphical user interface. The policy specifies actions that are to be taken in response to operations and/or stare changes that occur with respect to particular data items and/or users.

At block 504, the process receives a request to perform the security-related function. The request may be based on the policy, such as when the cloud-based service uses the policy to determine which SSP to utilize for a particular operation, user, or organization. The request is typically received from the cloud-based service and asks that the process perform some function, such as encryption, decryption, data, retrieval (e.g., read and forward to the cloud-based service), data storage (e.g., receive and store data from the cloud-based service). In some cases, the request may be received from a device of a user, such as when that device is redirected by the cloud-based service to interact with this process, such as is shown and described with respect to FIG. 4A, above.

At block 506, the process performs the security-related function on behalf of the cloud-based service. Performing the security-related function may include consulting the policy before, during, and/or after the function is performed. For example, suitable encryption keys may be located based on the policy. As another example, the process may notify the cloud-based service to remove any copies of the data item (e.g., document) after the item is successfully encrypted and stored by the process.

Figure 6:
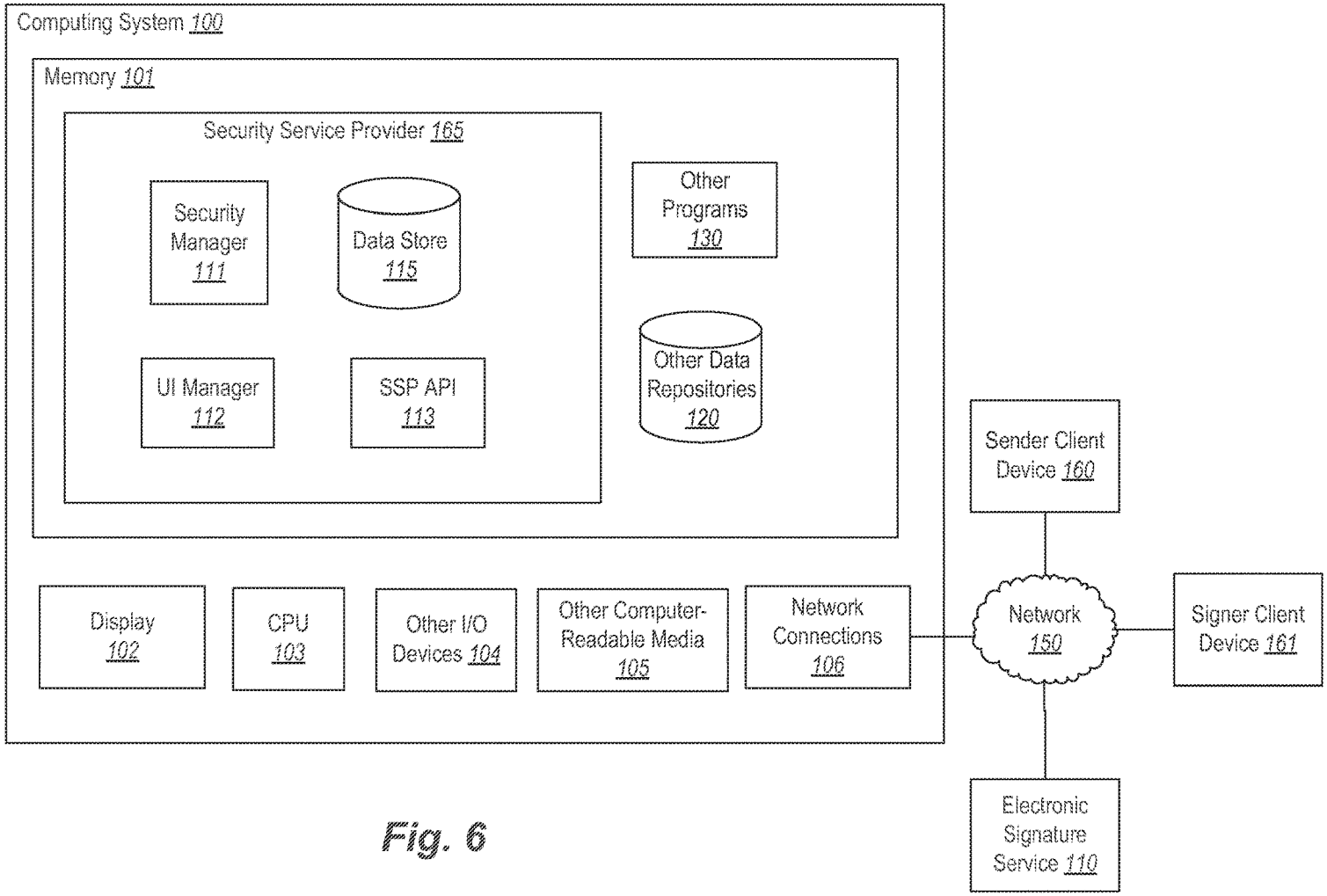
FIG. 6 is a block diagram of an example computing system for implementing example embodiments of the security service provider.

FIG. 6 is a block diagram of an example computing system for implementing example embodiments of the security service provider. In particular, FIG. 6 shows a computing system 100 that may be utilized to implement an SSP 165. Also, the techniques described with respect to FIG. 6 may be applied to implement other computerized elements discussed herein, such as the ESS 110, sender device 160, or the client device 161.

Note that one or more general purpose or special purpose computing systems/devices may be used to implement the SSP 165. In addition, the computing system 100 may comprise one or more distinct computing systems/devices and may span distributed locations. Furthermore, each block shown may represent one or more such blocks as appropriate to a specific embodiment or may be combined with other blocks. Also, the SSP 165 may be implemented in software, hardware, firmware, or in some combination to achieve the capabilities described herein.

In the embodiment shown, computing system 100 comprises a computer memory ("memory") 101, a display 102, one or more Central Processing Units ("CPU") 103, Input/Output devices 104 (e.g., keyboard, mouse, CRT or LCD display, and the like), other computer-readable media 105, and network connections 106 connected to a network 150. The SSP 165 is shown residing in memory 101. In other embodiments, some or all of the components of the SSP 165 may be stored on and/or transmitted over the other computer-readable media 105. The components of the SSP 165 preferably execute on one or more CPUs 103 and provide security services as described herein. Other code or programs 130 (e.g., an administrative interface, a Web server, and the like) and potentially other data repositories, such as data repository 120, also reside in the memory 101, and preferably execute on one or more CPUs 103. Of note, one or more of the components in FIG. 6 may not be present in any specific implementation. For example, some embodiments may not provide other computer readable media 105 or a display 102.

The SSP 165 includes a security manager 111, a user interface ("UI") manager 112, a security service provider application program interface ("API") 113, and a data store 115.

The security manager 111 generally performs the core security related operations of the SSP 165. For example, the security manager 111 may manage the storage and retrieval of documents, encryption keys, or other data stored in the data store 115. The security manager 111 may also or instead implement or manage the encryption and decryption operations performed by the SSP 165.

The UI manager 112 provides a view and a controller that facilitate user interaction with the SSP 165 and its various components. For example, the UI manager 112 may provide interactive access to the SSP 165 such that users can store or retrieve documents or other data, configure the operation of the SSP 165, or the like. In some embodiments, access to the functionality of the UI manager 112 may be provided via a Web server, possibly executing as one of the other programs 130. In such embodiments, a user operating a Web browser (or other client) executing on one of the client devices 160 or 161 can interact with the SSP 165 via the UI manager 112.

The API 113 provides programmatic access to one or more functions of the SSP 165. For example, the API 113 may provide a programmatic interface to one or more functions of the SSP 165 that may be invoked by one of the other programs 130 or some other module. In this manner, the API 113 facilitates the development of third-party software, such as user interfaces, plug-ins, data feeds, adapters (e.g., for integrating functions of the SSP 165 into Web applications), and the like. In addition, the API 113 may in at least some embodiments be invoked or otherwise accessed via remote entities, such as the ESS 110, to access various functions of the SSP 165. For example, the ESS 110 may transmit to the SSP 165 a document for storage via the API 113.

The data store 115 is used by the other modules of the SSP 165 to store and/or communicate information. The components of the SSP 165 use the data store 115 to record various types of information, including secure data, encryption keys, policy information, and the like. The data store 115 may implement the document store 170 and/or key store 171 described with respect to FIGS. 1 and 2.

The SSP 165 interacts via the network 150 with client devices 160 and 161, and the electronic signature service 110 (or some other service). The network 150 may be any combination of one or more media (e.g., twisted pair, coaxial, fiber optic, radio frequency), hardware (e.g., routers, switches, repeaters, transceivers), and one or more protocols (e.g., TCP/IP, UDP, Ethernet, Wi-Fi, WiMAX) that facilitate communication between remotely situated humans and/or devices. In some embodiments, the network 150 may be or include multiple distinct communication channels or mechanisms (e.g., cable-based and wireless). The client devices 160 and 161 include personal computers, laptop computers, smart phones, personal digital assistants, tablet computers, and the like.

In an example embodiment, components/modules of the SSP 165 are implemented using standard programming techniques. For example, the SSP 165 may be implemented as a "native" executable running on the CPU 103, along with one or more static or dynamic libraries. In other embodiments, the SSP 165 may be implemented as instructions processed by a virtual machine that executes as one of the other programs 130. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the SSP 165, such as in the data store 115, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 115 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the SSP 165 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure It should be apparent to those skilled in the art that many more modifications besides those already described are possible without departing from the inventive concepts herein. Moreover, in interpreting both the specification and the claims, all terms should be interpreted in the broadest possible manner consistent with the context. In particular, the terms "includes," "including," "comprises," and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring one or more elements from the set {A, C, . . . N}, and not N in addition to one or more elements from the set {A, B, C}.

All of the above-cited references, U.S. Provisional Application Ser. No. 61/772,397, entitled "SYSTEMS AND METHODS FOR CLOUD DATA SECURITY," and filed Mar. 4, 2013, are incorporated herein by reference in their entirety. Where a definition or use of a term in an incorporated reference is inconsistent or contrary to the definition of that term provided herein, the definition of that term provided herein governs and the definition of that term in the reference does not apply.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A system for protecting data-at-rest in a cloud-based service platform, the system comprising:

a network connection;

a working memory device;

a persistent data storage medium; and one or more processors [coupled to the working memory device, the network connection and the persistent data storage medium, the persistent data storage medium containing] *that execute* instructions that, when executed[on the system], cause the system to perform operations including:

[performing, using the one or more processors, a first action involving a document stored in the working memory device of the system;

upon] *following* completion of [the] *a* first action *involving a document stored in the working memory device*, transmitting, over the network connection, the document to a remote system operated by a security service provider for persistent storage, wherein prior to *the* transmitting, the document [being retained within the working memory device and] *is* not written to the persistent data storage medium;

deleting the document from the working memory device in response to receiving a confirmation of receipt of the document from the remote system[operated by the security service provider];

determining, after deleting the document, that a second action [requires access to] *involves* the document;

receiving[in response to a request], over the network connection using the one or more processors, the document from the remote system[operated by the security service provider];

in response to receiving the document, maintaining the document within the working memory device *during performance of the second action*, without writing the document to the persistent data storage medium;

[performing, using the one or more processors, the second action involving the document;] and upon completion of the second action[involving the document], deleting the document from the working memory device.

2. The system of claim 1, wherein the determining that the second action [requires access to] *involves* the document includes receiving a signature completion request from a [second] user.

3. The system of claim 2, wherein the [performing] *performance of* the second action includes presenting at least a representation of the document to the [second] user for signature.

4. The system of claim 3, wherein the [performing] *performance of* the second action includes receiving signature data from the [second] user representative of the [second] user applying a digital or electronic signature to the document.

5. The system of claim 4, wherein the [persistent storage medium further comprises] instructions [that] *further* cause the system to perform [the] *an* operation of storing the signature data in association with the document and the first action or the second action prior to deleting the document from the working memory *device*.

6. The system of claim 1, wherein the [performing] *performance of* the second action includes collecting and maintaining metadata confirming the second action associated with the document.

7. The system of claim 1, wherein the deleting the document from working memory device occurs in response to the following conditions:

no actions requiring access to the document are pending processing on the cloud-based service platform; and receipt of a confirmation from the remote system operated by the security service provider of receipt and storage of a current copy of the document.

8. The system of claim 1, wherein the [persistent data storage medium further comprises] instructions [that] *further* cause the system to perform operations including:

accessing a policy associated with a first user;

evaluating the first action or the second action and the document against the policy; and determining whether to persistently store the document with the security service provider based on results of evaluating the first action or the second action and the document.

9. The system of claim 8, wherein evaluating the document against the policy includes evaluating a status associated with the document against the policy.

10. A method for protecting data-at-rest in a cloud-based service platform, the method comprising:

[on a computing system within the cloud-based document management service platform performing operations including:

performing, using the one or more processors, a first action involving a document stored in the working memory device;

upon] *following* completion of [the] *a* first action *involving a document stored in a working memory device*, transmitting[, over the network connection,] the document to a remote system operated by a security service provider for persistent storage, wherein prior to *the* transmitting, the document [being retained within the working memory device and] *is* not written to the persistent data storage medium;

deleting the document from the working memory device in response to receiving a confirmation of receipt of the document from the remote system[operated by the security service provider];

determining, after deleting the document, that a second action [requires access to] *involves* the document;

receiving[in response to a request], over the network connection using the one or more processors, the document from the remote system[operated by the security service provider];

in response to receiving the document, maintaining the document within the working memory device *during performance of the second action*, without writing the document to the persistent data storage medium;

[performing, using the one or more processors, the second action involving the document;] and upon completion of the second action[involving the document], deleting the document from the working memory device.

11. The method of claim 10, wherein the determining that the second action [requires access to] *involves* the document includes receiving a signature completion request from a [second] user.

12. The method of claim 11, wherein the [performing] *performance of* the second action includes presenting at least a representation of the document to the [second] user for signature.

13. The method of claim 12, wherein the [performing] *performance of* the second action includes receiving signature data from the [second] user representative of the [second] user applying a digital or electronic signature to the document.

14. The method of claim 13, further comprising storing the signature data in association with the document and the first action or the second action prior to deleting the document from the working memory *device*.

15. The method of claim 10, wherein the [performing] *performance of* the second action includes collecting and maintaining metadata confirming the second action associated with the document.

16. The method of claim 10, wherein the deleting the document from the cloud-based service platform occurs in response to the following conditions:

no actions requiring access to the document are pending processing on the cloud-based service platform; and receipt of a confirmation from the remote system operated by the security service provider of receipt and storage of a current copy of the document.

17. The method of claim 10, wherein the receiving the document as part of a service request includes:

accessing a policy associated with a first user;

evaluating the first action or the second action and the document against the policy; and determining whether to persistently store the document with the security service provider based on results of evaluating the first action or the second action and the document.

18. The method of claim 17, wherein evaluating the document against the policy includes evaluating a status associated with the document against the policy.

19. A non-transitory computer-readable storage medium containing instructions that, when executed on a computer system within a cloud-based service platform, cause the computer system to perform operations including:

[performing, using the one or more processors, a first action involving a document stored in the working memory device;

upon] *following* completion of [the] *a* first action *involving a document stored in a working memory device*, transmitting, over the network connection, the document to a remote system operated by a security service provider for persistent storage, wherein prior to *the* transmitting, the document [being retained within the working memory device and] *is* not written to the persistent data storage medium;

deleting the document from the working memory device in response to receiving a confirmation of receipt of the document from the remote system[operated by the security service provider];

determining, after deleting the document, that a second action [requires access to] *involves* the document;

receiving[in response to a request], over the network connection using the one or more processors, the document from the remote system[operated by the security service provider];

in response to receiving the document, maintaining the document within the working memory device *during performance of the second action*, without writing the document to the persistent data storage medium;

[performing, using the one or more processors, the second action involving the document;] and upon completion of the second action[involving the document], deleting the document from the working memory device.

20. The non-transitory computer-readable storage medium of claim 19, wherein the determining that the second action [requires access to] *involves* the document includes receiving a signature completion request from a [second] user; and wherein the performing *of* the second action includes presenting at least a representation of the document to the [second] user for signature.

* * * * *